United States Patent

Yamaguro et al.

[11] Patent Number: 5,711,232
[45] Date of Patent: Jan. 27, 1998

[54] HEATER MEANS FOR STIRLING ENGINES

[75] Inventors: Akira Yamaguro, Chiryu; Naoki Minamoto, Toyota; Tomohiro Tokunaga; Akio Otsuka, both of Fukuoka-ken, all of Japan

[73] Assignees: Aisin Seiki Kabushiki Kaisha, Kariya; Kabushiki Kaisha Semitsu, Osaka, both of Japan

[21] Appl. No.: 268,957

[22] Filed: Jun. 30, 1994

[30] Foreign Application Priority Data

Jun. 30, 1993 [JP] Japan .................. 5-183310

[51] Int. Cl.$^6$ .................................. F23B 5/02
[52] U.S. Cl. .................. 110/212; 110/233; 431/2; 60/517
[58] Field of Search .............. 122/135.2; 126/110 R; 431/2; 60/517; 110/233, 347, 212

[56] References Cited

U.S. PATENT DOCUMENTS

| | | | |
|---|---|---|---|
| 685,835 | 11/1901 | Groh | 122/135.2 |
| 4,277,021 | 7/1981 | Daye | 126/110 R |
| 5,038,690 | 8/1991 | Kumagai et al. | 110/215 |
| 5,309,892 | 5/1994 | Lawlor | 126/100 R X |

FOREIGN PATENT DOCUMENTS 60-11659  1/1985  Japan .

Primary Examiner—Carl D. Price
Attorney, Agent, or Firm—Oblon, Spivak, McClelland, Maier & Neustadt, P.C.

[57] ABSTRACT

A Stirling engine has an external combustion chamber for burning a kerosene and transferring a high temperature therein to working fluid in heater tubes. In the case of the present invention, the external combustion chamber is connected to a furnace for burning industrial waste materials such as plastic materials or rubber materials so that the high temperature above 900° C. is able to be supplied to the combustion chamber. This serves in raising an output power of the Stirling engine. A conduit for connecting the furnace with the combustion chamber is proveded with a dumper capable of interrupting a flow of the high temperature combustion gases toward the combustion chamber of the Stirling engine.

5 Claims, 2 Drawing Sheets

HEATER MEANS FOR STIRLING ENGINES

BACKGROUND OF THE INVENTION

The present invention relates to heater means for Stirling engines and more particularly to heater means for Stirling engines which have a furnace for burning waste products.

A Stirling engine is extensively used for the operation of compressors, generators or pumps and comprises a cooler, a regenerator, a heater in an external combustion chamber, and two working chambers connected therethrough. An output power from the Stirling engine is obtained by heating a working gas in one of the working chambers and cooling the working gas in the other chamber. The heating of the working gas is achieved in such a manner that a high temperature of the combustion gases in the combustion chamber is transferred through the heater to the working gas therein and the combustion gases are produced by burning kerosene or gasoline.

Since waste products, for example industrial wastes such as useless plastic materials and rubber tires, are recentely increased and these industrial wastes are efficiently burnt in a furnace capable of clean combustion with a minimum of attention even when burning these wastes, an efficient use or recovery of the high temperature combustion gases as produced when these industrial wastes are burnt in the furnace is desired and several proposals therefor are offered. One example is disclosed in the Japanese Patent Laid-Open Publication (KOKAI) NO. Sho 60-11659 (1985).

A prior art as disclosed in said publication includes a Stirling engine having a boiler which leads to an external combustion chamber of the Stirling engine so that the combustion energy in the boiler can be supplied into the combustion chamber of the Stirling engine. However, the temperature of the resulting combustion gases in the boiler is in the order of 500° C. or less, accordingly, it is desired to raise the temperature of the combustion gases for increasing an output power from the Stirling engine.

Since the amount of gases in the combustion furnace of the boiler will depend upon the combustion condition in its furnace, the output power from the Stirling engine of this type is determined by the amount of the combusiton gases from the boiler's furnace. This system allows the regulation of the output power of the Stirling engine according to the amount of the combustion gases, but not the operation modes of the Stirling engine itself. For example, when an amount of the combustion gases from the boiler's furnace is small, the output power of the Stirling engine is not increased even when it is desired.

SUMMARY OF THE INVENTION

Therefore, an object of the present invention is to overcome the drawbacks of the prior art as mentioned above.

According to the present invention there is provided heater means for Stirling engines which includes a fan located in an outlet flue of a combustion chamber of the Stirling engine and conduit means for connecting a furnace for industrial waste materials with the combustion chamber of the Stirling engine.

In a most preferred mode of the present invention, heater means for Stirling engines comprises at least one flue conduit for opening an interior of a combustion chamber of the Stirling engine toward the atmosphere, at least one fan for permitting through the flue conduit an exhaust of the combustion gases in the combustion chamber for the Stirling engine toward the atmosphere, and a furnace for burning industrial waste materials which leads to the combustion chamber of the Stirling engine.

Preferably, the Stirling engine is connected to an electric generator and at least one damper is located in conduit means for supplying the combustion gases in the furnace to the combustion chamber of the Stirling engine. The damper is utilized for switching a flow of the combustion gases toward the combustion chamber of the Stirling engine or to exhaust the gases outwardly. Dry distillation gases are preferably re-burnt in the combustion chamber of the furnace.

The combustion of the industrial waste materials such as useless plastic materials or rubber materials is able to produce combustion gases having a temperature of 900° C. or more. The use of the fan allows an introduction volume of the high temperature combustion gases into the combustion chamber of the Stirling engine to be exactly regulated.

BRIEF DESCRIPTION OF THE DRAWINGS

The above and other objects, features and advantages of the present invention will become more apparent through the detailed description taken in conjuction with the accompanying drawings, in which.

DETAILED DESCRIPTION OF THE PREFERRED EMBODIMENTS

Figure 1:
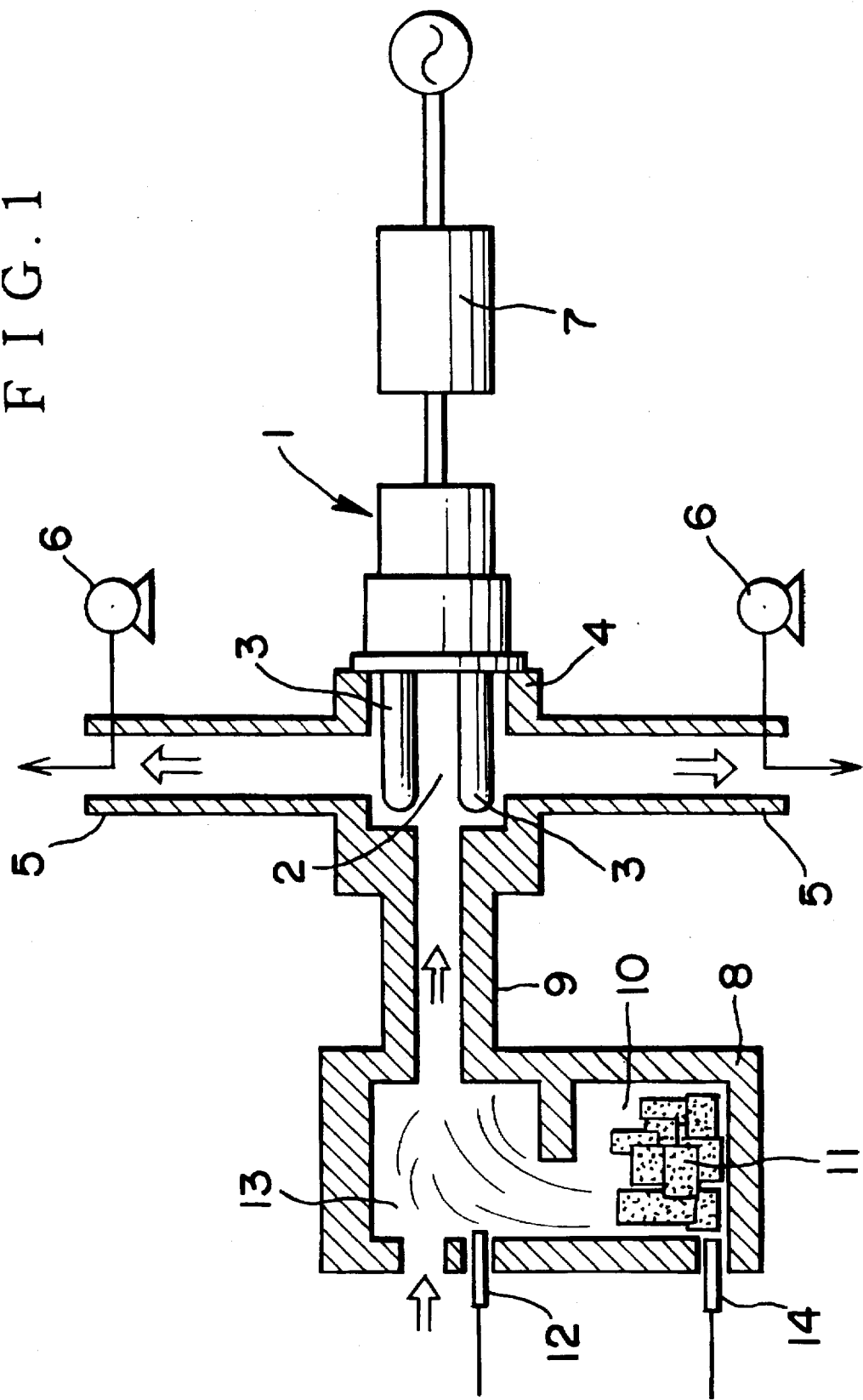
FIG. 1 is a cross sectional view showing a preferred embodiment of the present invention.

A basic structure of a Stirling engine 1 is the same as that of a conventional one and hence the detailed description thereof is omitted. In a combustion chamber 2 of the Stirling engine 1 heater tubes 3 are arranged in a conventional manner. The combustion chamber 2 is defined by wall means 4 having smoke outlet flues or flue conduits 5,5 through which the combustion gases in the chamber 2 are exhausted outwardly. The flues 5,5 are provided with fans 6, respectively. An outlet portion of the Stirling engine is connected to an electric generator 7.

A furnace 8 for burning industrial waste materials 11 is disposed near the Stirling engine 1 and is connected through conduit means 9 to the combustion chamber 2 of the Stirling engine 1. The furnace 8 includes a primary combustion chamber 10 for burning the industrial waste materials 11 on a hearth thereof and a secondary combustion chamber 13 for burning combustible dry distillation gases such as methane from the primary combustion chamber 10. A pilot burner 12 will assist in burning the dry distillation gases in the secondary combustion chamber 13 and a fuel burner 14 will serve to burn the waste materials 11 in the primary combustion chamber 10. The secondary combustion chamber 13 leads through conduit means 9 to the combustion chamber 2 of the Stirling engine 1 so as to supply the hot gases in the secondary chamber 13 into the interior of the combustion chamber 2.

The industrial waste materials 11 in the primary combustion chamber 10 are heated and decomposed by means of the fuel burner 14 so that the combustible dry distillation gases such as methane are generated and these gases are burnt in the secondary combustion chamber 13 by means of the pilot burner 12, of which a temperature exceeds 900° C.

According to operation modes of the Stirling engine 1 the rotation of the fans 6 is adjusted to control the rate of feed of the high temperature combustion gases from the secondary chamber 13 to the combustion chamber 2 of the Stirling engine 1. The change in the rotation of the fans 6 causes a suction volume of the hot gases from the secondary chamber 13 into the combustion chamber 2 to be varied. The high temperature of the combustion gases is transferred to the working gas in the heater tubes 3 and the combustion gases are exhausted through the smoke flues 5,5 outwardly.

In a high load mode of the Stirling engine 1, the rotation of the fans 6 is increased to draw a large volume of the hot gases from the secondary chamber 13 into the combustion chamber 2 of the Stirling engine 1. In other words, it is possible to draw the hot gases into the combustion chamber 2 according to the operation mode of the Stirling engine 1.

Further, the fans 6 will serve in maintaining suction state in conduit means 9 or any portions where the hot gases flow, so that a sealing efficiency is improved.

Figure 2:
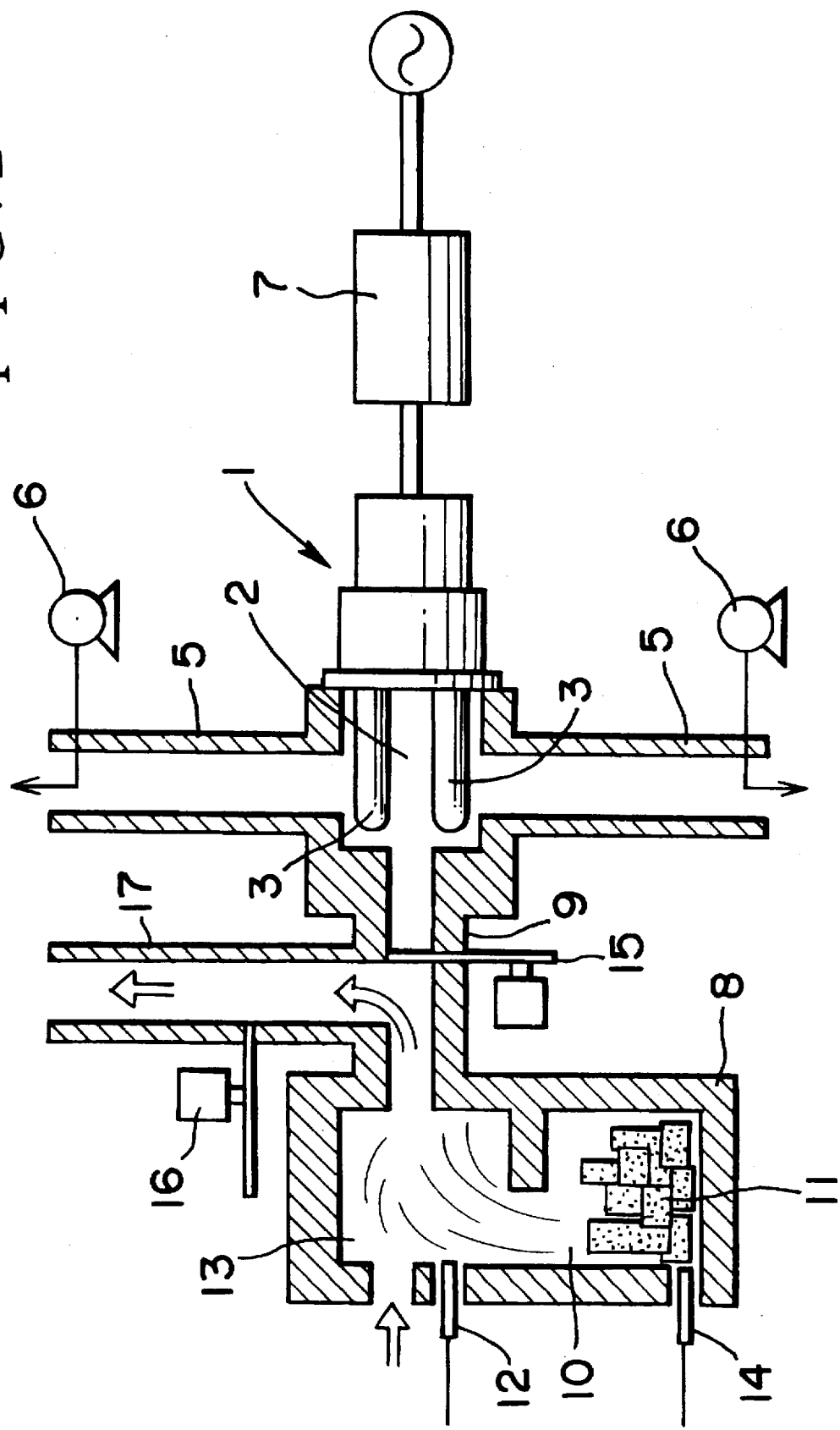
FIG. 2 is a cross sectional view showing another embodiment of the present invention.

Conduit means 9 as illustrated in FIG. 2 is provided with a damper 15 and another flue 17 having another damper 16. In this embodiment, when the Stirling engine 1 is not operated, the first damper 15 closes a passage of the conduit means 9 and the second damper 16 opens a passage of the flue 17 to exhaust the hot gases outwardly. When the hot gases in the secondary combustion chamber 13 is to be introduced into the combustion chamber 2 of the Stirling engine 1, the first damper 15 opens the passage of the conduit means 9 and the second damper 16 closes the passage of the flue 17. These dampers 15, 16 are operated by a motor.

The invention has thus been shown and described with reference to specific embodiments, however, it should be noted that the invention is in no way limited to the details of the illustrated arrangements but changes and modifications may be made without departing from the scope of the appended claims.

What is claimed is:

1. Heater means for Stirling engines having a combustion chamber, comprising:

at least one flue conduit for discharging gases in a combustion chamber of the Stirling engine outwardly;

at least one fan located in the flue conduit to draw the gases outwardly;

a furnace having a primary combustion chamber for burning industrial waste materials and a secondary combustion chamber for burning combustible dry distillation gases from the primary combustion chamber; and conduit means for connecting the secondary combustion chamber of the furnace with the combustion chamber of the Stirling engine, and for providing hot combustion gases generated by burning combustible dry distillation gases in the secondary chamber of the furnace to the combustion chamber of the Stirling engine.

2. Heater means for Stirling engines according to claim 1, wherein the conduit means is provided with a damper capable of interruption of a flow of hot combustion gases from the secondary combustion chamber of the furnace to the combustion chamber of the Stirling engine.

3. Heater means for Stirling engines according to claim 1, wherein the secondary combustion chamber of the furnace is provided with a pilot burner.

4. Heater means for Stirling engines according to claim 1, wherein a temperature of the hot combustion gases from the secondary combustion chamber of the furnace is 900° C. or more.

5. Heater means for Stirling engines having a combustion chamber, comprising:

a furnace having a primary combustion chamber for burning industrial waste materials and a secondary combustion chamber for burning combustible dry distillation gases from the primary combustion chamber; and conduit means for connecting the secondary combustion chamber with the combustion chamber of the Stirling engine, and for providing hot combustion gases generated by burning combustible dry distillation gases in the secondary combustion chamber to the combustion chamber of the Stirling engine;

wherein the secondary combustion chamber of the furnace is provided with a pilot burner.

* * * * *